US006937564B2

United States Patent
Anttila

(10) Patent No.: US 6,937,564 B2
(45) Date of Patent: Aug. 30, 2005

(54) MANAGEMENT OF DOWNLINK TBF IN AN EGPRS AND IN A GPRS MOBILE STATION USING FINAL BLOCK INDICATOR AND RELATIVE RESERVED BLOCK PERIOD FIELD

(75) Inventor: Hannu Juhani Anttila, Tampere (FI)

(73) Assignee: Nokia Corporation, Espoo (FI)

( * ) Notice: Subject to any disclaimer, the term of this patent is extended or adjusted under 35 U.S.C. 154(b) by 92 days.

(21) Appl. No.: 10/448,898

(22) Filed: May 30, 2003

(65) Prior Publication Data

US 2004/0240423 A1 Dec. 2, 2004

(51) Int. Cl.[7] .......................... H04Q 7/00; H04L 12/28
(52) U.S. Cl. ...................... 370/230; 370/329; 370/349; 370/401
(58) Field of Search ............................... 370/230, 329, 370/349, 389, 401, 465, 468, 328, 338, 352, 535; 455/450

(56) References Cited

U.S. PATENT DOCUMENTS

| | | | | |
|---|---|---|---|---|
| 6,665,280 B2 * | 12/2003 | Forssell et al. | ............. | 370/329 |
| 2002/0105940 A1 * | 8/2002 | Forssell et al. | ............. | 370/349 |
| 2004/0120253 A1 * | 6/2004 | Forssell et al. | ............. | 370/230 |

OTHER PUBLICATIONS

3GPP TS 44.060 V6.1.0 (Feb. 2003) Technical Specifiction "3rd Generation Partnership Project . . . " Global System for Mobile communication (GSM). pp 108–112.*

3GPP TS 44.060 V6.6.0 (Feb. 2003), "3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)", pp. 1–11, 108–124.

* cited by examiner

Primary Examiner—Afsar Qureshi
(74) Attorney, Agent, or Firm—Harrington & Smith, LLP

(57) ABSTRACT

A method is disclosed for receiving a downlink radio link control (RLC) data block with a mobile station, as is a mobile station and a computer program that operate in accordance with the method. The method includes receiving the RLC data block; determining if a final block indicator (FBI) bit is set and, if it is, determining if a Relative Reserved Block Period (RRBP) field is valid, and, if it is not, discarding the received data block. For the case where the mobile station is in an EGPRS TBF mode of operation, and if a retransmitted RLC data block is split into two parts, and if in a first part of the retransmitted RLC data block the FBI is set, and in a second retransmitted part of the RLC data block there is a valid RRBP field, then these data blocks are retained.

6 Claims, 7 Drawing Sheets

DOWNLINK RLC DATA BLOCK WITH MAC HEADER

EGPRS DOWNLINK RLC DATA BLOCK HEADER FOR MCS-7, MCS-8 AND MCS-9

FIG.2D
PRIOR ART

EGPRS DOWNLINK RLC DATA BLOCK HEADER FOR MCS-5 AND MCS-6

FIG.2E
PRIOR ART

EGPRS DOWNLINK RLC DATA BLOCK HEADER FOR MCS-1, MCS-2, MCS-3 AND MCS-4

FIG.2F
PRIOR ART

FINAL BLOCK INDICATOR BIT

| BIT 1 | FINAL BLOCK INDICATOR |
|---|---|
| 0 | CURRENT BLOCK IS NOT LAST RLC DATA BLOCK IN TBF |
| 1 | CURRENT BLOCK IS LAST RLC DATA BLOCK IN TBF |

FIG. 2G
PRIOR ART

EGPRS SUPPLEMENTARY/POLLING (ES/P) FIELD

| BITS 5 4 | ES/P |
|---|---|
| 0 0 | RRBP FIELD IS NOT VALID (NO POLLING) |
| 0 1 | RRBP FIELD IS VALID – EXTENDED ACK/NACK BIT MAP TYPE FPB |
| 1 0 | RRBP FIELD IS VALID – EXTENDED ACK/NACK BIT MAP TYPE NPB |
| 1 1 | RRBP FIELD IS VALID – ACK/NACK BITMAP TYPE NPB, MEASUREMENT REPORT INCLUDED |

FIG. 2H
PRIOR ART

SUPPLEMENTARY/POLLING (S/P) BIT – GPRS CASE AND RLC/MAC CONTROL

| BIT 4 | S/P |
|---|---|
| 0 | RRBP FIELD IS NOT VALID |
| 1 | RRBP FIELD IS VALID |

FIG. 2I
PRIOR ART

MANAGEMENT OF DOWNLINK TBF IN AN EGPRS AND IN A GPRS MOBILE STATION USING FINAL BLOCK INDICATOR AND RELATIVE RESERVED BLOCK PERIOD FIELD

TECHNICAL FIELD

This invention relates generally to wireless digital communications systems and, more specifically, relates to Radio Link Control (RLC) protocols used for sending packet data in a downlink (DL) direction from a base station to a mobile station.

BACKGROUND

In the Enhanced General Packet Radio System (EGPRS) the length of checksum (CRC, parity bits, 3GPP 05.03) for RLC packets in the Layer 1 interface is 12 bits, while in Release 1997 (R97) and R99 of the General Packet Radio System (GPRS) the checksum is 16 bits. Layer 1 uses the checksum for detecting whether a received packet was corrupted in the air interface. It should be noted that while the data lengths in EGPRS are longer than in GPRS, the CRC is shorter. As a result, it is much more probable in EGPRS that a RLC packet can be corrupted during transit in the air interface in such a manner that its CRC is still correct. In this situation the Layer 1 sees the frame as being correctly received and delivers it to the RLC layer. There are at least two problems that can arise when undetected packet corruption takes place.

The first problem occurs if the first data bit (FBI) was not corrupted, and is as follows. After receiving all of the frames belonging to a Logical Link Control frame (LLC, the data protocol layer above the RLC), the RLC delivers the Packet Data Unit (PDU) to the LLC. The LLC performs its own checksum computation and detects an error. In this case the LLC packet is discarded.

The second problem occurs if the first data bit (FBI) is changed from a 0 to 1, and is as follows. The mobile station erroneously detects that the block is the last block in the downlink (DL) direction and ends the currently established Temporary Block Flow (TBF). The network then must again establish the TBF. This type of error is expected to occur less frequently than LLC checksum errors.

In either case, the user perceives the occurrence of these failure modes as a reduction in data throughput.

Since packet corruption happens more frequently under poor radio conditions, the link adaptation procedures performed by the wireless network could alleviate the problem. However, if the performance of the EGPRS CRC error detection was made similar to that of GPRS R97, the length of the CRC in EGPRS would need to be longer than 16 bits. This is due at least in part to the fact there are more bytes in EGPRS blocks than in GPRS blocks, and that data blocks modulated with EGPRS 8PSK modulation are more susceptible to errors than are GPRS GMSK modulated data blocks.

As may be appreciated, increasing the number of CRC bits in EGPRS is not readily accomplished, as it would require a substantial standardization change, with corresponding changes having to be made in the installed base of equipment (mobile stations, base transceiver stations, base station controller, etc.) This is clearly an undesirable solution.

SUMMARY OF THE PREFERRED EMBODIMENTS

The foregoing and other problems are overcome, and other advantages are realized, in accordance with the presently preferred embodiments of these teachings.

A method is disclosed for receiving a downlink radio link control (RLC) data block with a mobile station, as is a mobile station and a computer program that operate in accordance with the method. The method includes receiving the RLC data block; determining if a final block indicator (FBI) bit is set and, if it is, determining if a Relative Reserved Block Period (RRBP) field is valid, and, if it is not, discarding the received data block.

For the case where the mobile station is in an EGPRS TBF mode of operation, and if a retransmitted RLC data block is split into two parts, and if in a first part of the retransmitted RLC data block the FBI is set, and in a second retransmitted part of the RLC data block there is a valid RRBP field, then these data blocks are retained.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 2D, 2E and 2F show downlink EGPRS RLC control blocks, for various cases MCS cases, FIG. 2G shows the states of a prior art FBI bit found in FIGS. 2A–2F, FIG. 2H shows the prior art EGPRS Supplementary/Polling (ES/P) field, and FIG. 2I shows the prior art GPRS Supplementary/Polling (S/P) bit.

DETAILED DESCRIPTION OF THE PREFERRED EMBODIMENTS

Figure 1:
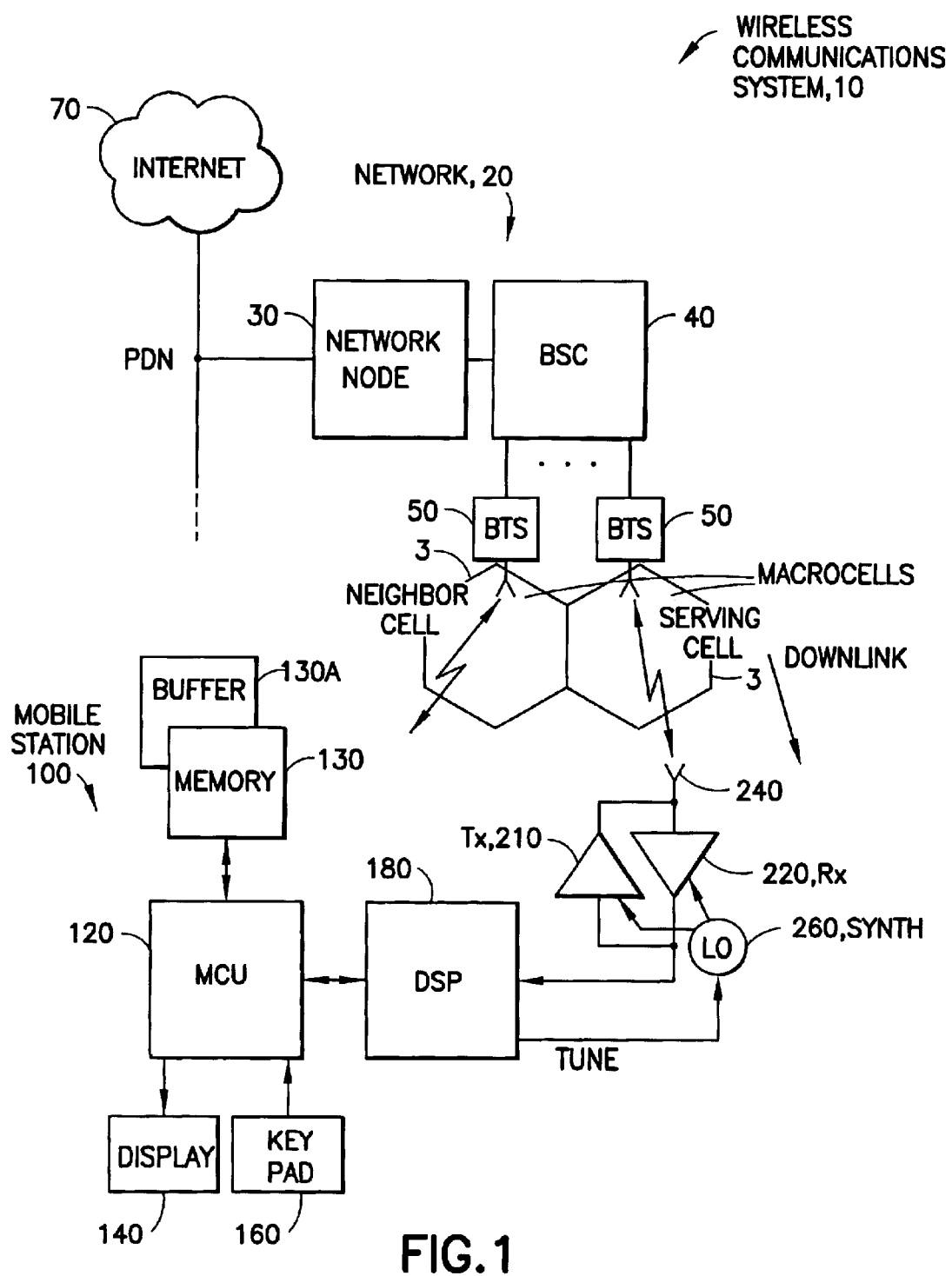
FIG. 1 is a simplified block diagram of a wireless communications system that is suitable for implementing the teachings of this invention.
Figure 2A:
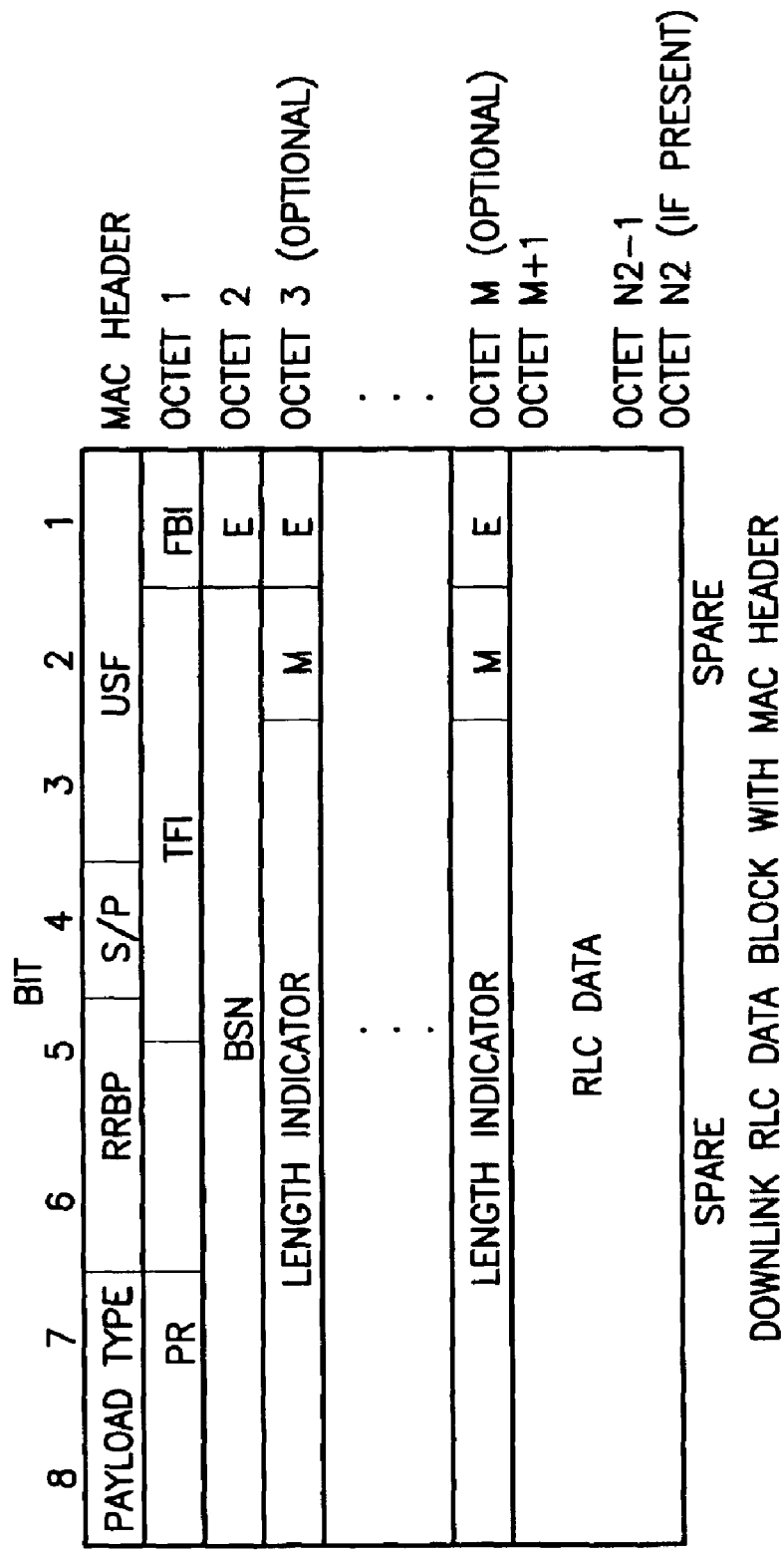
FIGS. 2A and 2B show prior art downlink GPRS RLC data and control blocks, respectively, with MAC headers.
Figure 2B:
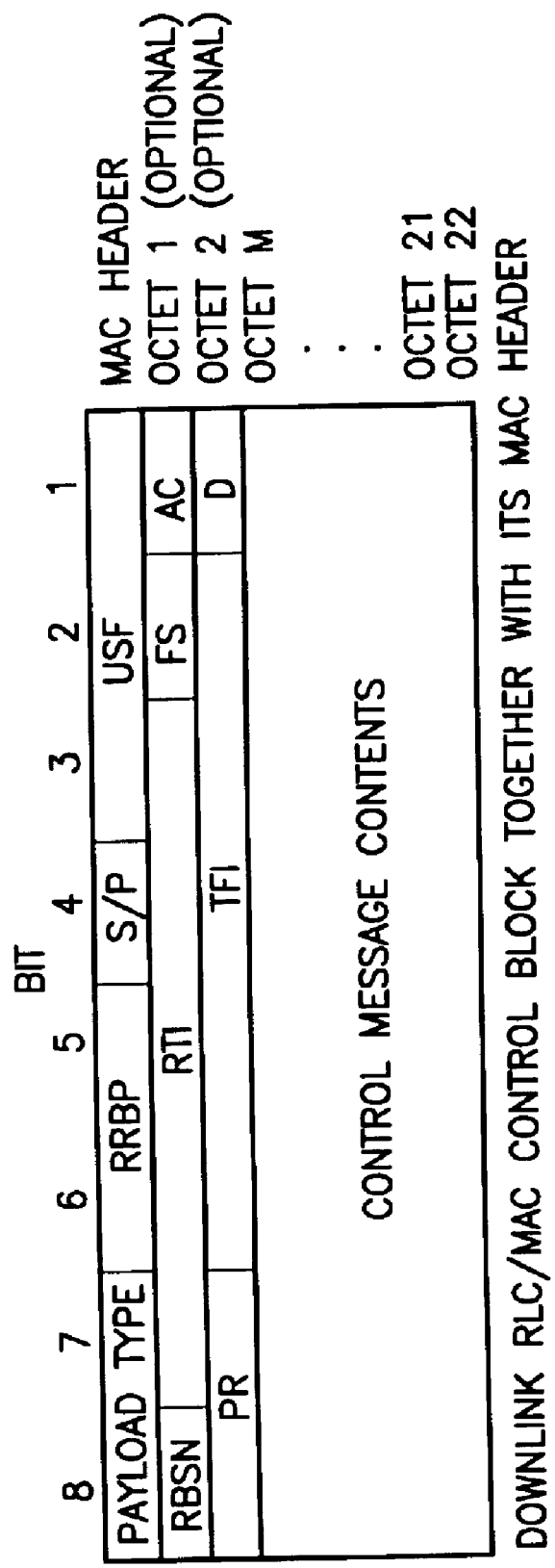
Figure 2C:
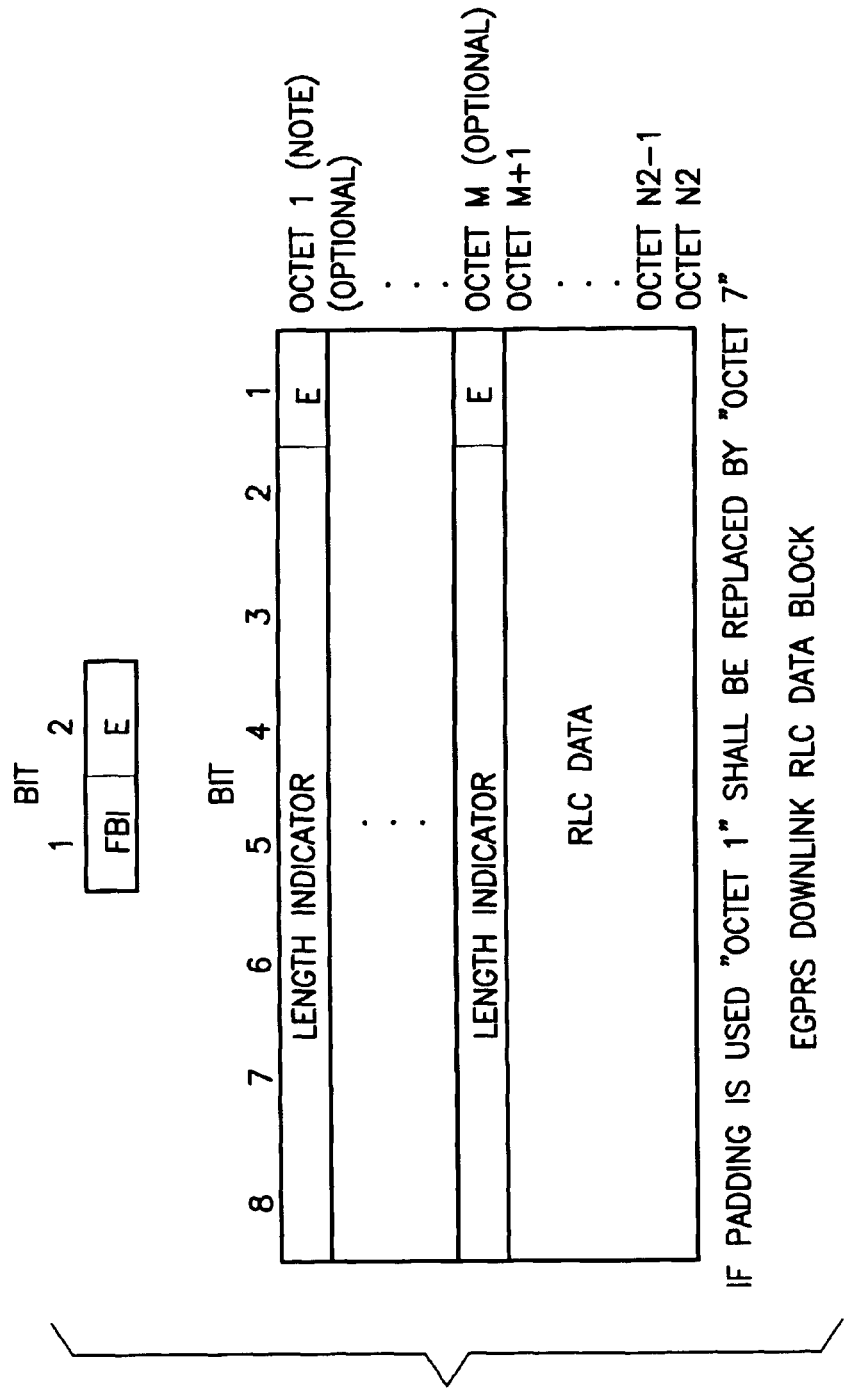
FIG. 2C shows a prior art downlink EGPRS RLC data block.

By way of introduction, and referring to FIG. 1, there is shown as a simplified block diagram an embodiment of a wireless communications system 10 that is suitable for practicing this invention. The wireless communications system 10 includes at least one mobile station (MS) 100. FIG. 1 also shows an exemplary network 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station (MS) 100 in accordance with a predetermined air interface standard. A reverse or uplink communication path also exists from the mobile station 100 to the network 20, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. In the presently preferred embodiment of this invention the air interface standard is compatible with at least one of the GPRS and EGPRS air interface standards, although this is not a limitation upon the practice of this invention.

The MS 100 typically includes a control unit or control logic, such as a microcontrol unit (MCU) 120 having an output coupled to an input of a display 140 and an input coupled to an output of a keyboard or keypad 160. The MS 100 may be a handheld radiotelephone, such as a cellular telephone or a personal communicator. The MS 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer 130A. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

The MS 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network 20. At least one local oscillator, such as a frequency synthesizer (SYNTH) 260, is provided for tuning the transceiver. Data, such as digitized voice and packet data, is transmitted and received through the antenna 240.

In order to gain a better understanding of the operation of this invention, it will be instructive to review relevant aspects of the currently specified downlink packet transmission procedure. Reference can also be made to FIGS. 2A–2G.

The standard 3GPP TS 44.060-V5.5.0 specifies the procedure for how the network 20 ends data flow in the DL direction in GPRS and EGPRS (chapter 9.3.2.6, Release of downlink Temporary Block Flow) as follows.

The network 20 initiates the release of a downlink TBF by sending an RLC data block with the Final Block Indicator (FBI) set to the value '1', and with a valid Relative Reserved Block Period (RRBP) field. The RRBP field is specified in chapter 10.4.5 as containing a value that specifies a single uplink block in which the mobile station transmits to the network 20 either a PACKET CONTROL ACKNOWLEDGMENT message or a PACCH block. The network 20 then starts a timer (T3191) for the TBF. While the timer is running for the TBF the network 20 may retransmit the RLC data block with the FBI bit set to the value '1'. For each retransmission the timer is restarted.

In the EGPRS TBF mode, if the final RLC data block is split for retransmission over two radio blocks (see subclause 9.3.2.1), the network 20 sets the FBI to the value '1' in each part of the retransmitted RLC data block.

If the MS 100 receives an RLC data block (or, in EGPRS TBF mode, a part of a retransmitted RLC data block) with the FBI bit set the value '1' and with a valid RRBP field, the MS 100 transmits a PACKET DOWNLINK ACK/NACK message in the specified uplink block. The MS 100 continues to monitor all assigned PDCHs (Packet Data Channels).

Whenever the MS 100 receives an RLC data block (or, in EGPRS TBF mode, a part of a retransmitted RLC data block) with a valid RRBP, and the MS 100 has received all RLC data blocks of the TBF, the MS 100 sends the PACKET DOWNLINK ACK/NACK message with the Final Ack Indicator bit set to '1', and stops a timer designated T3190 for the TBF, and starts, or restarts a timer T3192 for the TBF.

In GPRS TBF mode, if the MS 100 receives more than one RLC data block with the FBI set to '1', it accepts the data from only the first one of these blocks.

If the network 20 receives a PACKET DOWNLINK ACK/NACK message for the TBF before its timer expires, and if retransmissions are required, then the network 20 stops the timer for the TBF and retransmits the necessary RLC data blocks according to the ARQ protocol before re-initiating the release of the downlink TBF. The FBI is set to '1'only if the RLC data block with the highest Block Sequence Number (BSN) of the TBF is retransmitted. If no retransmission is required, the network 20 stops the timer T3191 for the TBF and starts or restarts a second timer (T3193) for the TBF. When timer T3193 expires the network 20 releases the TBF. If the timer T3191 expires for the TBF, then the network 20 releases the TBF.

If the network 20 has received the PACKET DOWNLINK ACK/NACK message with the Final Ack Indicator bit set to '1' and has new data to transmit for the mobile station that cannot be transmitted on any ongoing downlink TBF, the network 20 may establish a new downlink TBF for the mobile station by sending the PACKET DOWNLINK ASSIGNMENT or PACKET TIMESLOT RECONFIGURE message with the Control Ack bit set to '1' on the Packet Assignment Control Channel (PACCH). In the case where the network 20 establishes a new downlink TBF for the MS 100, the network 20 stops the timer T3193 for the TBF.

In an A/Gb mode, if the MS 100, after sending the PACKET DOWNLINK ACK/NACK message with the Final Ack Indicator bit set to '1', receives a PACKET DOWNLINK ASSIGNMENT or PACKET TIMESLOT RECONFIGURE message with the Control Ack bit set to '1', while timer T3192 is running, the MS 100 stops the timer T3192, consider the previous downlink TBF as released, and acts upon the new assignment.

In an Iu mode, if the MS 100, after sending the PACKET DOWNLINK ACK/NACK message with the Final Ack Indicator bit set to '1' for a given TBF, receives a PACKET DOWNLINK ASSIGNMENT, MULTIPLE TBF DOWNLINK ASSIGNMENT, PACKET TIMESLOT RECONFIGURE or MULTIPLE TBF TIMESLOT RECONFIGURE message with the Control Ack bit set to '1' for the current TBF, while timer T3192 is running, the MS 100 stops this instance of timer T3192, considers this downlink TBF as released, and act upon the new assignments.

When timer T3192 expires the MS 100 releases the downlink TBF. If there is no ongoing TBF, the MS 100, in packet transfer mode or in the Media Access Control (MAC)-Shared state, returns to the packet idle mode or the MAC-Idle state. In a dual transfer mode the MS 100 returns to the dedicated mode or to the MAC-Dedicated state. The Discontinuous Reception (DRX) mode procedures are applied, as specified in sub-clause 5.5.1.5, 3GPP TS 44.160 sub-clause 5.4.1.8.

The foregoing portion of the standard specifies how the MS 100 should react when it receives a packet with the FBI and valid RRBP field. However, the standard does not specify what the MS 100 should do when the FBI is received and the RRBP is not valid. The FBI bit is used in downlink to inform the MS 100 that data flow is ending, and the RRBP field is used to cause the MS 100 to send the acknowledgment to the network 20.

In the EGPRS TBF mode, the RRBP field is considered not valid (no polling) when the EGPRS Supplementary/Polling (ES/P) field is set to '00'. With all other values the RRBP is considered to be valid, as defined in 3GPP 04.60, chapter 10.4.4a(see FIG. 2H). In the GPRS TBF mode, the RRBP field is considered to be valid when the Supplementary/Polling (S/P) bit is set to '1', as defined in 3GPP 04.60, chapter 10.4.4(see FIG. 2I).

As was discussed above, when the packets are transmitted through the air interface they are protected in Layer 1 with a checksum. When the MS 100 receives a packet it decodes the bits and then determines whether the checksum (CRC) is correct. If the CRC is correct the packet is delivered to RLC layer, otherwise it is discarded. There are separate checksums for RLC header and for the data parts. The FBI bit belongs to the data part, while the RRBP field belongs to the RLC header and, in general, the RLC header is better protected against errors than is the data part. If the FBI bit becomes corrupted (corruption from 0 to 1), and if the CRC decodes correctly, the erroneous data part of the received packet is delivered to the RLC. Thus, the situation can occur that the RRBP is not valid, but the FBI is inadvertently received as being set (the RLC in this case receives a different FBI bit than was actually sent by the network 20). This leads to the situation where the RLC of the MS 100 believes that downlink data flow is ending, and the MS 100reacts accordingly. This reduces data throughput in the downlink, since the downlink data flow must be started again, which requires some finite amount of time to initiate.

In accordance with this invention, the MS 100 is enabled to detect the occurrence of erroneous RLC blocks when the FBI bit is corrupted and the RRBP field is invalid. This occurs as follows: if a received block having the FBI bit set to a one is received, and if the received block does not have a valid RRBP field, the block can be discarded, thereby improving the data throughput. This mode of operation is applicable both in both the GPRS and EGPRS modes.

Figure 3:
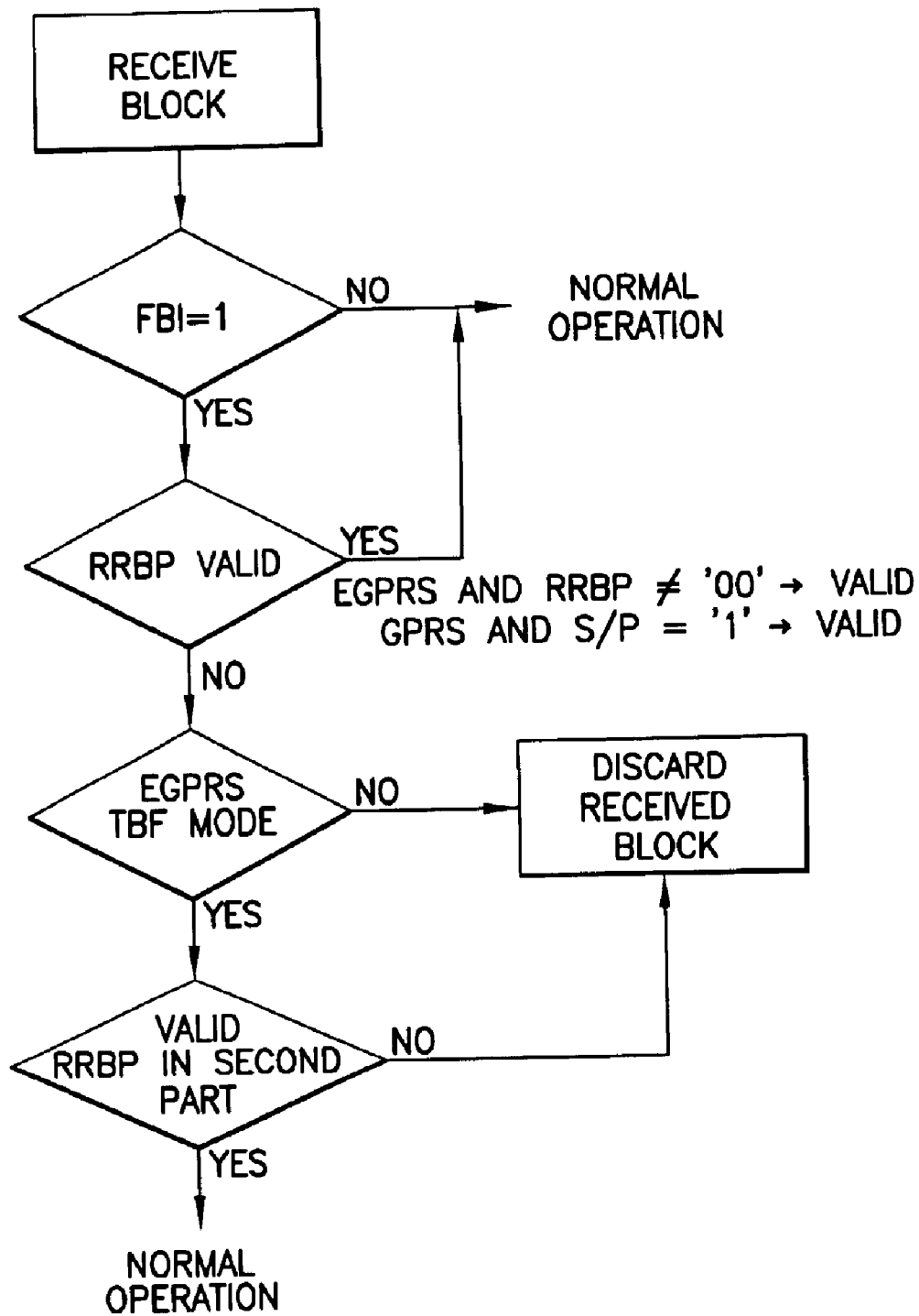
FIG. 3 is a logic flow diagram in accordance with a method of this invention.

Stated another way, and referring to FIG. 3, if the MS 100 receives an RLC data block (or, in the EGPRS TBF mode, a part of a retransmitted RLC data block) with the FBI bit set the value '1', and with an invalid RRBP field, the MS 100 discards the block. However, if in the EGPRS TBF mode, and in the first part of a retransmitted RLC data block the FBI is set to the value of '1', and in the second retransmitted part of the RLC data block there is a valid RRBP field, then these blocks are not discarded.

The use of this invention thus makes it possible for the MS 100 to detect erroneous RLC blocks when the FBI bit is corrupted and RRBP field is invalid.

While disclosed in the context of a method for receiving RLC data blocks, and a controller 120, 180 that operates to receive RLC data blocks, it should be appreciated that this invention pertains as well to a computer program that is embodied on or in a medium readable by the controller 120, 180, such as the memory 130, for causing the controller 120, 180 to operate in accordance with the method.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent signaling formats, message names and message field names maybe attempted by those skilled in the art. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method for receiving a downlink radio link control (RLC) data block with a mobile station, comprising:

receiving the RLC data block;

determining if a final block indicator (FBI) bit is set=1;

if it is, determining if a Relative Reserved Block Period (RRBP) field is valid, and, if it is not, discarding the received data block.

2. A method as in claim 1, where if the mobile station is in an Enhanced General Packet Radio Service (EGPRS) Temporary Block Flow (TBF) mode of operation, and if a retransmitted RLC data block is split into two parts, and if in a first part of the retransmitted RLC data block the FBI is set, and in a second retransmitted part of the RLC data block there is a valid RRBP field, then these data blocks are retained.

3. A mobile station comprising:

a receiver for receiving a downlink radio link control (RLC) data block;

a controller coupled to an output of the receiver for determining if a final block indicator (FBI) bit is set=1 in the received RLC data block and, if it is, for determining if a Relative Reserved Block Period (RRBP) field is valid, and, if it is not, said controller discarding said received RLC data block without passing it to an RLC layer.

4. A mobile station as in claim 3, where said controller is responsive to the mobile station being in an Enhanced General Packet Radio Service (EGPRS) Temporary Block Flow (TBF) mode of operation, where a retransmitted RLC data block is split into two parts, for determining if in a first part of the retransmitted RLC data block the FBI is set, and if in a second retransmitted part of the RLC data block there is a valid RRBP field, for retaining the data blocks.

5. A computer program embodied in a computer readable medium for controlling operation of a controller of a mobile station, said mobile station comprising a receiver for receiving a downlink radio link control (RLC) data block; said controller operating under control of said computer program for determining if a final block indicator (FBI) bit is set=1 in a received RLC data block and, if it is, for determining if a Relative Reserved Block Period (RRBP) field is valid, and, if it is not, said controller further operating under control of said computer program for discarding said RLC received data block without passing it to an RLC layer.

6. A computer program as in claim 5, where said controller further operates under control of said computer program to be responsive to the mobile station being in an Enhanced General Packet Radio Service (EGPRS) Temporary Block Flow (TBF) mode of operation, when a retransmitted RLC data block is split into two parts, for determining if in a first part of the retransmitted RLC data block the FBI is set, and if in a second retransmitted part of the RLC data block there is a valid RRBP field, for retaining the data blocks.

* * * * *